United States Patent [19]

Bhaumik

[11] Patent Number: 5,031,328
[45] Date of Patent: Jul. 16, 1991

[54] ILLUMINATED OPTICAL TOOLING TARGET

[75] Inventor: Pradeep K. Bhaumik, Rancho Cucamonga, Calif.

[73] Assignee: Northrop Corporation, Hawthorne, Calif.

[21] Appl. No.: 422,329

[22] Filed: Oct. 16, 1989

[51] Int. Cl.$^5$ .................... G01C 15/02; G01C 15/06
[52] U.S. Cl. ........................................ 33/293; 33/299
[58] Field of Search .................. 33/241, 293, 294, 295, 33/296, 228, 348; 362/800; 356/251

[56] References Cited

U.S. PATENT DOCUMENTS

| | | | |
|---|---|---|---|
| 1,778,323 | 10/1930 | James | 33/293 |
| 2,538,475 | 1/1951 | Skrastin, Jr. | 33/293 |
| 2,570,458 | 10/1951 | Kowalczyk | 33/293 |
| 2,915,618 | 12/1959 | Rongavs | 33/293 |
| 3,972,622 | 8/1976 | Mason et al. | 33/293 |
| 4,177,572 | 12/1979 | Hindes | 33/293 |
| 4,346,329 | 8/1982 | Schmidt | 362/800 |
| 4,488,050 | 12/1984 | Iwafune | 33/293 |
| 4,644,661 | 2/1987 | Bozzolato | 33/293 |
| 4,820,041 | 4/1989 | Davidson et al. | 356/1 |
| 4,866,849 | 9/1989 | Parra | 33/293 |
| 4,926,563 | 5/1990 | Smith | 33/293 |
| 4,964,218 | 10/1990 | Morghen | 33/293 |

*Primary Examiner*—William A. Cuchlinksi, Jr.
*Assistant Examiner*—Alvin Wirthlin

*Attorney, Agent, or Firm*—Terry J. Anderson; Robert B. Block

[57] ABSTRACT

An improved target for use in an optical measurement system comprising an upper cylindrical housing portion and a lower cylindrical housing portion separably coupled at an intermediate location, the lower housing portion having a lower cylindrical region of a reduced diameter depending therefrom for receipt in a hole of the tooling to be sighted and an upper region having threads and an upwardly facing cylindrical recess, the upper cylindrical portion having threads at a lower region for separably coupling with threads of the lower portion and with the upper region having a downwardly facing cylindrical recess; illumination mechanisms positioned within the recesses and comprising a battery, a light emitting diode and potting material therebetween in a cylindrical configuration with electrical contacts extending from its lower face in contact with the battery and from one side surface in contact with the housing for establishing electrical contact between the battery and the light emitting diode; and a viewer operatively coupling the light emitting diode and the geometric center of an upper surface of the housing for illuminating the geometric center of the upper surface of the housing for sighting. Also disclosed is the system in which such target is used as well as its method of use.

6 Claims, 2 Drawing Sheets

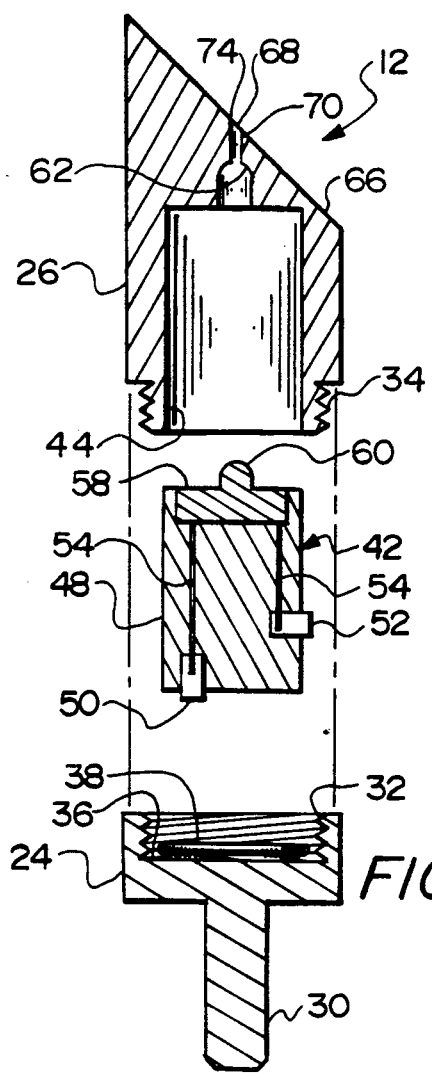
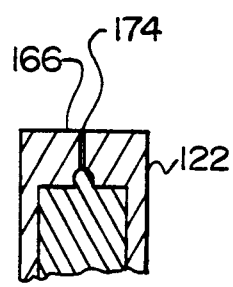
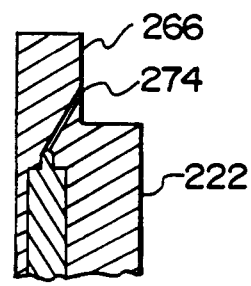
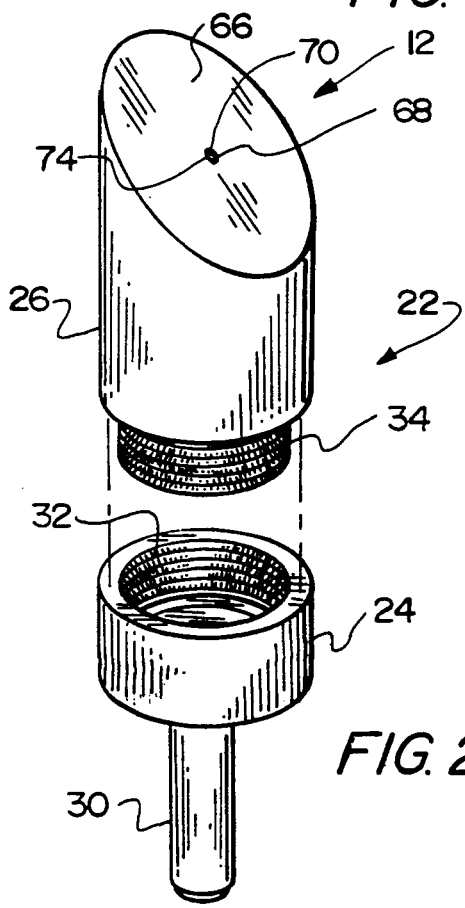
FIG. 3  FIG. 4  FIG. 6  FIG. 5  FIG. 2

ILLUMINATED OPTICAL TOOLING TARGET

BACKGROUND OF THE INVENTION

This invention relates to an illuminated optical tooling target, method and apparatus and, more particularly, to apparatus including a separable two-piece target housing and, located therein, illumination mechanisms and a power source for illuminating an upper surface of the housing.

DESCRIPTION OF THE BACKGROUND ART

A jig and a fixture are types of tooling devices used to position and hold workpieces during machining operations such as drilling, cutting or the like and to guide a tool for such machining operations. Tooling may also be used to position a plurality of parts to create an assembly. Such tooling is provided with critically located part index holes and with abutment surfaces in order to effect the proper positioning of such workpieces or parts. If the holes and abutment surfaces of the tooling are not located properly, the workpieces produced or parts assembled with such tooling will not meet their engineering design requirements.

The process of providing holes, abutment surfaces, etc. in proper, precise locations on tooling is normally effected through a reference system such as a tool and ball system or a line-of-sight system. In each of these reference systems, a sighting target is positioned on the tooling. Instruments are then used to determine proper, precise locations with respect to such targets and instruments. Advanced computer-aided systems, such as photogrammetry or computer-aided theodolites (CAT), may be utilized in either of the above-referred to reference systems.

The target of the present invention was developed so as to allow the utilization of a typical tooling line-of-sight system with a computer aided theodolite (CAT) system. CAT is a portable optical coordinate measurement system that, in association with a target or targets, employs a computer to calculate the x, y and z coordinates of the target point or spot.

It has been found that the accuracy of reading a target through a sighting instrument with respect to a target is improved if the target is rendered more visible through internal illumination, particularly when lighting is less than optimum. The target design of the present invention allows, for the first time, visibility at locations where lighting is less than optimum. Further, with the use of advanced fiber optic technology, the center of the target surface to be sighted can be made extremely small for more accurate sightings. It has also been found that the illuminated target of the sighting surface of a target also allows for more accurate sighting even during adequate lighting conditions.

Other benefits of the present invention are durability and maintenance. With the proposed high carbon, tool steel material, the wear life under normal usage is virtually lifetime. Material stability allows the fixed accuracy of the target's critical features to last indefinitely. The target is also separable to allow for easy replacement of the power source, the illumination mechanisms, or to change the orientation of the top portion of the target. This is to present a target at any one of a plurality of angles, including horizontal, vertical, or any angular relationship therebetween, with the light source always being centrally located. The target is also removable from the tooling thus allowing for easy replacement and for interchangability with other types of optical tooling targets.

Various approaches are disclosed in the patent literature for determining locations or for the positioning of one part with respect to another. By way of example, U.S. Pat. Nos. 1,179,409 to Donnell; 1,778,323 to James; 2,915,618 to Rongaus; and 3,833,799 Audet all relate to one type or another of target, generally for use in the surveying field, with illumination means, lamp and/or battery, incorporated therein. More specifically, Donnell describes a lighted range finder, the purpose of which is to enable a surveyor to locate the range finder in low light conditions. It is several feet tall and rather bulky in nature. The James patent relates to a method of illuminating a scale so that the scale may be read under low light conditions. It is not a target. The Rongaus patent describes a light-projecting stick so that nighttime gunners are able to have something to aim at under night conditions. Audet describes an illuminated light emitting diode, the intensity of which varies with the ambient light. Its purpose is to be a reference system in a gun sight.

U.S. Pat. No. 4,716,507 to Ames relates to an improved optical collimator. Its purpose is for calibration of optical instruments not for optical sighting. The Hogan Patent, U.S. Pat. No. 3,790,277, relates to a tracking system. The tracking system is based on the transmission and reception of an infrared beam. Two additional patents to Mason and Unema, U.S. Pat. Nos. 3,972,622 and 3,819,273, disclose targets which sense a moving beam of light and thus generate means to operate signaling lamps thereon. In the Mason patent, light emitting diodes are turned on based upon the reception of light on photodetectors. U.S. Pat. No. 3,778,169 to Adams is used for aligning a collimated light source, such as a laser, from what is proposed as an LED target. The Adams device uses purely optical means. Lastly, U.S. Pat. No. 4,488,050 to Iwafune relates to a level measurement device and is not intended to be an optical target.

A prior patent application assigned to the assignee of the present invention, there is described a related invention in which the present invention could be utilized. Such application is U.S. patent application Ser. No. 07/222,459 filed July 21, 1988 in the name of Morash. There is disclosed therein an adjustment mechanism for the precise positioning of a hole for supporting an optical tooling target or the like. The optical tooling target of the present invention could be readily used and adjusted in the environment as described in such patent application. In addition, the optical tooling target of the present invention could be used in a wide variety of conventional or other innovative assemblies, systems, or applications. The subject matter of such applications is incorporated by reference herein.

As illustrated by the great number of prior patents and commercial devices and techniques, efforts are continuously being made in an attempt to improve methods and apparatus for determining locations and for positioning one component with respect to another. Such efforts are being made to render such processes more efficient, reliable, inexpensive and convenient to use. None of these previous efforts, however, provides the benefits attendant with the present invention. Additionally, the prior patents and commercial devices and techniques do not suggest the present inventive combination of method steps and component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

Therefore, it is an object of this invention to provide an improved target for use in an optical measurement system comprising an upper cylindrical housing portion and a lower cylindrical housing portion separably coupled at an intermediate location, the lower housing portion having a lower cylindrical region of a reduced diameter depending therefrom for receipt in a hole of the tooling to be sighted and an upper region having threads and an upwardly facing cylindrical recess, the upper cylindrical portion having threads at a lower region for separably coupling with threads of the lower portion and with the upper region having a downwardly facing cylindrical recess; illumination mechanisms positioned within the recesses and comprised of a battery, a light emitting diode and potting material therebetween in a cylindrical configuration with electrical contacts extending from its lower face in contact with the battery and from one side surface in contact with the housing for establishing electrical contact between the battery and the light emitting diode; and viewing means operatively coupling the light emitting diode and the geometric center of an upper surface of the housing for illuminating the geometric center of the upper surface of the housing for sighting.

It is a further object of this invention to illuminate the target surface of an optical tooling target.

It is yet a further object of the present invention to more precisely determine locations or to position one part with respect to another.

Lastly, it is an object of the present invention to sight optical tooling targets more efficiently, conveniently and economically.

The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiments in addition to the scope of the invention defined by the claims taken in conjuction with the accompanying drawings.

SUMMARY OF THE INVENTION

The invention is defined by the appended claims with the specific embodiment shown in the attached drawings. For the purpose of summarizing the invention, the invention may be incorporated into an improved target for use in an optical measurement system comprising an upper cylindrical housing portion and a lower cylindrical housing portion separably coupled at an intermediate location, the lower housing portion having a lower cylindrical region of a reduced diameter depending therefrom for receipt in a hole of the tooling to be sighted and an upper region having threads and an upwardly facing cylindrical recess, the upper cylindrical portion having threads at a lower region for separably coupling with threads of the lower portion and with the upper region having a downwardly facing cylindrical recess; illumination mechanisms positioned within the recesses and comprised of a battery, a light emitting diode and potting material therebetween in a cylindrical configuration with electrical contacts extending from its lower face in contact with the battery and from one side surface in contact with the housing for establishing electrical contact between the battery and the light emitting diode; and viewing means operatively coupling the light emitting diode and the geometric center of an upper surface of the housing for illuminating the geometric center of the upper surface of the housing for sighting.

The viewing means of the light emitting diode may be an aperture in the upper surface of the housing. The viewing means may be an optical fiber positioned in a bore extending through the upper portion between the light emitting diode and the upper surface of the upper portion. The top surface of the light emitting diode is dome shaped to constitute a lens for light gathering purposes. The upper surface may be eliptical and in a plane at an angle offset from the axis of the target and with the end of the optical fiber at the upper surface being located on the axis. The upper surface may be circular and in a plane transverse to the axis of the target and with the end of the optical fiber at the upper surface being located on the axis. The upper surface may be rectangular and in a plane containing the axis of the target and with the end of the optical fiber at the upper surface being located on the axis.

In addition, the invention may be incorporated into apparatus comprising an upper cylindrical housing portion and a lower cylindrical housing portion separably coupled at an intermediate location, the lower housing portion having a lower cylindrical region of a reduced diameter depending therefrom and an upper region having threads and an upwardly facing cylindrical recess, the upper cylindrical portion having threads at a lower region for separably coupling with threads of the lower portion and with the upper region having a downwardly facing cylindrical recess; illumination mechanisms positioned within the recesses and comprised of a battery, a light emitting diode and potting material therebetween in a cylindrical configuration with electrical contacts extending from its lower face in contact with the battery and from one side surface in contact with the housing for establishing electrical contact between the battery and the light emitting diode; and viewing means operatively coupling the light emitting diode and the geometric center of an upper surface of the housing for illuminating the geometric center of the upper surface of the housing.

In addition, the present invention may be incorporated into an improved system for sighting a target in tooling comprising, in combination a cylindrical target having illumination mechanisms with an illuminated spot at the geometric center of an upper surface and on the axis of the target for sighting with a theodolite; means to position the lower region of the target in a hole in the tooling; instruments in operative association with the target for sighting the illuminated spot; and computer means operatively coupling the sighting instruments to accurately determine the precise location of the illuminated center, target and hole in the tooling.

Lastly, the present invention may be incorporated into an improved method for sighting a target positioned in tooling comprising the steps of providing a cylindrical target having illumination mechanisms with an illuminated spot at the geometric center of an upper surface and on the axis of the target for sighting with a theodolite; illuminating the spot; positioning the lower region of the target in a hole in the tooling; sighting the illuminated geometric center of the target with sighting instruments; and operatively coupling the sighting instruments with a computer to accurately determine the precise location of the illuminated center, target and hole in the tooling.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific embodiments may be readily utilized as a basis for modifying or designing other methods and structures for carrying out the same purposes of the present invention. It should be realized by those skilled in the art that such equivalent methods and structures do not depart from the spirit and scope of the invention as set forth in the appended claims.

BRIEF DESCRIPTION OF THE DRAWINGS

For a fuller understanding of the nature and objects of the present invention, reference should be had to the following details description taken in conjunction with the accompanying drawings in which:

FIG. 2 is an exploded sectional view of the housing of the optical tooling target shown in FIGS. 1.

FIG. 3 is an exploded sectional view of the optical tooling target shown in FIGS. 1 and 2.

FIGS. 4 through 6 are partial sectional views of the upper portion of various embodiments of the optical tooling target, all being constructed in accordance with the principles of the present invention.

Similar reference characters refer to similar parts throughout the several Figures.

DETAILED DESCRIPTION OF THE INVENTION

Figure 1:
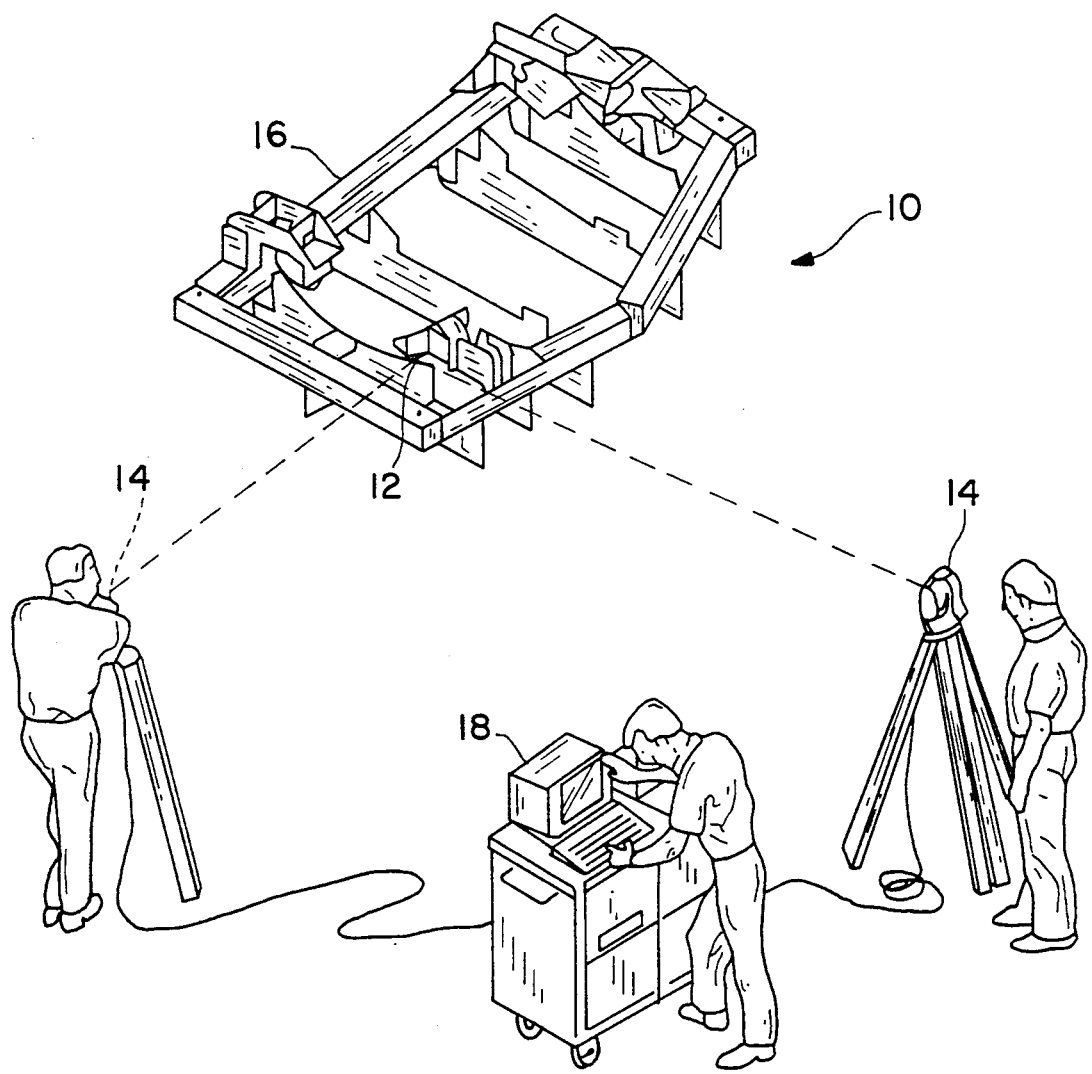
FIG. 1 is a schematic illustration of a sighting system including a optical tooling target constructed in accordance with the principles of the present invention.

With particular reference to the Figures, there is shown in FIG. 1, a typical application of an optical measurement system 10 including an optical tooling target 12 constructed and assembled in accordance with the principles of the present invention. This system may be a theodolite system, photogrammetry system or the like. Such a system simply includes the plurality of sighting devices or theodolites 14, instruments through which the operator or operators may look for viewing the target 12. The target is securely positioned in the tooling or tool 16 which requires the precise positioning. A computer 18 couples the theodolites 14 to effect such precise locating and positioning. From a general standpoint the system is conventional in the art.

The inventive target of the present invention can best be seen by reference to the exploded illustration of FIGS. 2 and the sectional view of FIG. 3. The target includes a two-piece housing 22 having a lower portion 24 and an upper portion 26 couplable together by screw threads at their area of mating. The lower portion of the housing has a depending cylindrical member 30 of a reduced diameter adapted to be positioned in an essentially like diameter hole of the tooling. It is the position of the target which is to be viewed and corrected by the sighting devices in combination with the computer. The lower portion of the housing includes a dish-like member with internal threads 32 for receiving the external threads 34 of the upper portion 26. The lower portion has an upwardly facing cylindrical recess 36 of such size as to receive a battery 38 constituting the power source for the illumination mechanisms 42.

The upper portion 26 of the housing 22 is cylindrical, of an external diameter equal to the diameter of the external cylindrical surface of the lower portion 24. At its lower end, the upper portion is of a reduced external diameter with external threads 34 for matingly coupling with the internal threads 32 of the lower portion. The majority of the extent of the upper portion is formed as a downwardly facing cylindrical recess 44, for receiving the illumination mechanisms. The upper and lower portions are preferably fabricated of high-carbon steel and machined to very precise tolerances.

Positionable within the cavity or recess 44 of the upper portion 26 of the housing 22 are the illumination mechanisms 42. The exterior diameter of the illumination mechanisms 42 is substantially the same as the interior diameter of the recess 44 of the upper portion in which it is received for operation and use. The bulk of the material of the illuminating mechanisms 42 is formed of an electrically insulative potting material 48, such as an epoxy resin material, having formed therein brass plugs 50 and 52. One of the plugs 50 extends axially downwardly for contact with the anode of the battery 38. The other of the plugs extends radially from one side of the potting material for electrical contact with the upper extent of the housing to provide an electrical contact with the periphery of the battery. Electrical leads 54, as of copper, extend upwardly to a light emitting diode through the potting material 48.

The light emitting diode (LED) 58 is cylindrical for the majority of its extent and, except for the upper surface, is embedded and secured within the potting material. The upper or top portion of the LED is a dome 60 of a hemispherical configuration for being received in a hemispherically shaped upper cavity 62 of the upper housing portion 26.

Extending from the geometric center of the upper surface 66 of the housing is a cylindrical bore 68. The bore 68 extends downwardly so that an optical fiber 70 may be positioned from the upper surface 66 down to the light emitting diode 58. The optical fiber has a diameter of between about 0.020 and 0.080 inches. The upper surface of the housing and the optical fiber are each ground smooth and positioned to form continuous surface. The lower surface of the optical fiber contacts the light emitting diode 58 for the transmission of illumination from the light emitting diode to the center of the upper surface of the assembly for constituting the spot or point 74 to be viewed by the theodolites. The spot or point is on the axis or centerline CL of the target and housing. Electrical power is transmitted to the light emitting diode 58 from the battery 38 through the plugs 50 and 52 and electrical conductors 54 to opposite sides of the light emitting diode for its energization and illumination.

FIGS. 1 through 3 illustrate the primary or preferred embodiment of the invention. FIGS. 4, 5 and 6 all illustrate alternate embodiments of the present invention. In the alternate embodiments, the majority of the component elements of the target are the same as those described with respect to FIGS. 1 through 3.

FIG. 4 is an alternate embodiment of the present invention which includes a right angled upper surface 166 of the housing 122. The upper surface and spot 174 are in a plane which is horizontal. This is in contrast to the embodiment of FIG. 2 and 3 in which the upper surface may be at any angle with respect to the horizontal or vertical as a function of the particular objective of the system or application. The upper surface is an elipse with its center at the geometric center of the upper surface on the axis of the housing and spot.

FIG. 5 is yet a further embodiment of the present invention. According to the FIG. 5 embodiment, the upper surface 266 is located vertically, in a plane which includes the axis of the housing and spot 274. The upper surface of the housing 222 is formed as a rectangle within a vertical plane extending along the axis. As in the prior embodiments, an aperture is drilled through the precise geometric center of the upper surface 266 and extends downwardly therefrom at an angle to the light emitting diode.

In the FIG. 6 embodiment, the optical fiber is eliminated and the hemispherical upper dome shaped cavity 362 of the upper portion of the housing 322 extends directly through the upper surface 366 of the housing 322. The upper extent of the light-emitting diode thus directly constitutes the source of illumination of the spot 374 which is thus the viewing means on the upper surface of the target rather than the LED of the prior embodiments.

As can be seen by a comparison of the foregoing several embodiments, all include the target assembly having an upper and lower portion separable for the receipt of an illumination mechanisms. The particular location and angular orientation of the upper surface of the target is a matter of design choice but the illuminated point or spot thereof is always on the axis of the target and housing. The upper surface may be parallel with, or perpendicular with respect to, the axis or may extend at any angle with respect thereto. The selected embodiment is a function of the system or application in which the target is to be utilized. The use of the precisely positioned illuminated target increases the accuracy and capabilities of the system and adds to the convenience of its use.

In operation and use, a plurality of optical sighting devices or instruments are positioned in operative proximity to the region of the tooling which is to be sighted. An optical tooling target of a cylindrical design and with internal illuminating mechanisms is then provided and positioned within a hole of the tooling, within the line of sight of the sighting devices. The illuminating mechanisms are assembled and energized prior to the positioning within the hole. The illuminating mechanisms thus illuminate a spot or point at the geometric center of an upper surface of the optical sighting target and on its axis. The optical sighting devices are operatively coupled with a computer. The illuminated spot is then sighted with the optical sighting devices and electronic information from the optical sighting devices is fed to the computer for determining the location of the spot, target and tooling.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described, what is claimed is:

1. An improved target for use in an optical measurement system for use in manufacturing tooling, said tooling having a reference hole to be sighted, comprising:
   an upper cylindrical housing portion and a lower cylindrical housing portion separably coupled together, the lower housing portion having a lower cylindrical projection of a reduced diameter depending therefrom for receipt in said reference hole,
   said lower housing further having an upper region having threads and an upwardly facing cylindrical recess,
   said upper cylindrical portion having threads at a lower region for separably coupling with threads of the lower portion, said upper portion further having a downwardly facing cylindrical recess;
   illumination mechanisms positioned within the recesses and comprised of a battery, a light emitting diode, and potting material therebetween in a cylindrical configuration with electrical contacts extending from its lower face in contact with the battery and from one side surface in contact with housing for establishing electrical contact between the battery and the light emitting diode;
   said light emitting diode having a dome shaped top surface for emitting light; and
   an optical fiber operatively coupling the light emitting diode and the geometric center of an upper surface of the housing for illuminating the geometric center of the upper surface of the housing for sighting.

2. An illuminated target for use in manufacturing tooling in which locations are marked by reference holes comprising:
   a housing including an upper portion and a lower portion constructed for being coupled together;
   said lower portion having a lower cylindrical region of a reduced diameter depending therefrom and an upper region having threads and an upwardly facing cylindrical recess,
   said upper portion having threads at a lower region for separably coupling with threads of the lower portion and further having a downwardly facing cylindrical recess;
   said lower portion having a projection depending therefrom for being positioned in a reference hole in the tooling;
   means contained within the housing for forming a concentrated light source and including a light emitting diode and a battery connected to said diode to energize the same;
   diode support means received within said recesses together with the battery and the diode, said support means carrying two electrical contacts, one of said contacts extending into contact with the housing to a common electrical connection to the battery on one side thereof, and the other contact extending into direct electrical contact with the battery on the other side;

said diode having an output surface which is dome shaped; and means forming a precise sighting location on the upper portion opening to said diode output surface to define a luminous spot at the sighting location on said target.

3. An improved target for use in an optical measurement system for tooling, said tooling having alignment holes therein, comprising:

a housing including an upper cylindrical housing portion and a lower cylindrical housing portion, said lower housing portion having a lower cylindrical projection of reduced diameter depending therefrom for defining an axis of said target, said projection adapted to be received in an alignment hole of the tooling to be sighted for support of said target therein, said lower portion further having an upper region having threads and an upwardly facing cylindrical recess, said upper housing portion having threads at a lower region for separably coupling with threads of the lower housing portion, said upper portion further having a downwardly facing cylindrical recess adapted to communicate with said upwardly facing recess of said lower portion, a cylindrical body carrying illumination means positioned within said recesses and comprised of a battery, a light emitting diode and potting material for supporting the same in the shape of a cylinder for fitting in said recesses, said cylindrical body having a side wall and a lower wall, a first electrical contact extending from the diode through said lower wall into contact with the battery and a second electrical contact extending from the diode and through said side wall into contact with the housing for establishing an electrical circuit between the battery and the light emitting diode;

said light emitting diode having a dome shaped top surface;

said upper housing portion having an upper surface an aperture formed at the geometric center in said upper surface of the housing and on said axis, and an optical fiber operatively coupling the light from the diode to the aperture for sighting.

4. The target as set forth in claim 3 wherein said upper surface is elliptical and in a plane at an angle offset from said axis of said target with the end of said optical fiber at said upper surface being located on the axis.

5. The target as set forth in claim 3 wherein said upper surface is circular and in a plane transverse to said axis of said target and with the end of said optical fiber at said upper surface being located on said axis.

6. The target as set forth in claim 3 wherein said upper surface is rectangular and in a plane containing said axis of the target and with the end of the optical fiber at said upper surface being located on said axis.

* * * * *